United States Patent [19]
Katter et al.

[11] 3,910,595
[45] Oct. 7, 1975

[54] ASPIRATING APPARATUS AND METHOD FOR CRASH RESTRAINT SYSTEM

[75] Inventors: Lincoln B. Katter, Bellevue; Michael W. Wells, Kirkland, both of Wash.

[73] Assignee: Rocket Research Corporation, Redmond, Wash.

[22] Filed: June 14, 1971

[21] Appl. No.: 152,895

Related U.S. Application Data

[63] Continuation-in-part of Ser. No. 84,266, Oct. 27, 1970, abandoned.

[52] U.S. Cl. .......................................... 280/150 AB
[51] Int. Cl. ............................................. B60r 21/10
[58] Field of Search ...... 280/150 AB; 417/179, 191; 60/270 S

[56] References Cited
UNITED STATES PATENTS

| | | | |
|---|---|---|---|
| 3,411,807 | 11/1968 | Carey et al. | 280/150 AB |
| 3,450,414 | 6/1969 | Kobori | 280/150 AB |
| 3,460,746 | 8/1969 | Green et al. | 417/179 X |
| 3,624,810 | 11/1971 | Hass | 280/150 AB |
| 3,663,036 | 5/1972 | Johnson | 280/150 AB |
| 3,674,059 | 7/1972 | Stephenson | 280/150 AB |
| 3,675,942 | 7/1972 | Huber | 280/150 AB |

Primary Examiner—David Schonberg
Assistant Examiner—David M. Mitchell
Attorney, Agent, or Firm—Graybeal, Barnard, Uhlir & Hughes

[57] ABSTRACT

A crash restraint device for an automobile comprising a box-like frame having a substantially closed sidewall and front inlet opening and a rear outlet opening; an inflatable bag mounted at the rear opening; a plurality of high velocity aspirating jet units placed within said frame upstream of the bag and arranged to direct aspirating air into said bag so as to draw in aspirated air through the inlet; a valve at the inlet, which valve is closed at the initial portion of the inflation, open during the middle and latter parts of inflation, and closed at the completion of inflation.

5 Claims, 16 Drawing Figures

INVENTORS
LINCOLN B. KATTER
BY MICHAEL W. WELLS

ATTORNEYS

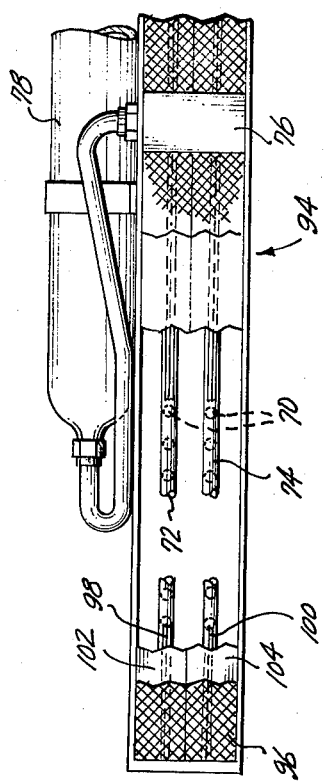
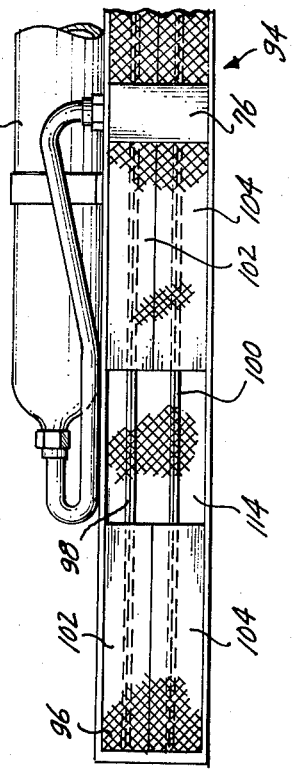
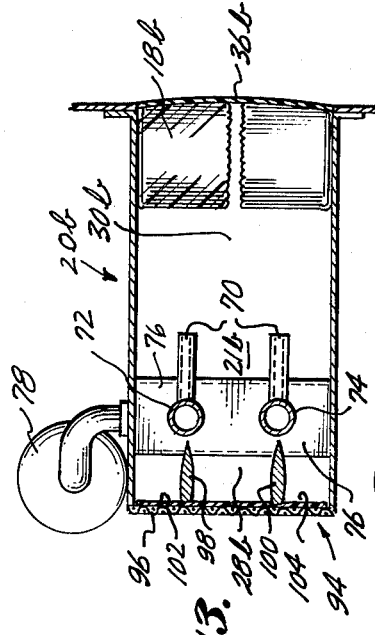
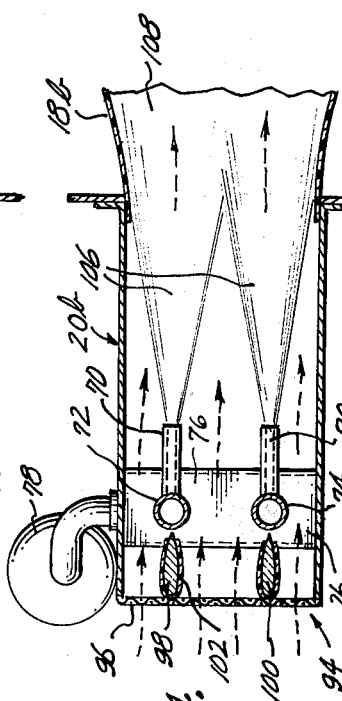
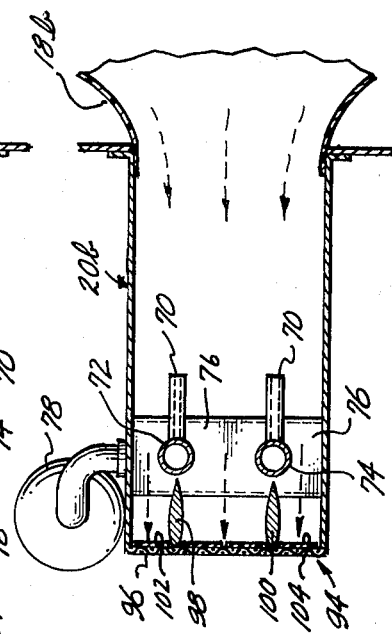

ASPIRATING APPARATUS AND METHOD FOR CRASH RESTRAINT SYSTEM

CROSS REFERENCE TO RELATED APPLICATIONS

This is a continuation-in-part application to our pending U.S. patent application, entitled, "Automobile Crash Restraint Apparatus," Ser. No. 84,266, filed Oct. 27, 1970 and now abandoned.

BACKGROUND OF THE INVENTION

1. Field of the Invention

This invention relates to a crash restraint system in which a bag is inflated to prevent a passenger in an automobile from being thrown violently against the steering wheel, dashboard or other automobile structure.

2. Description of the Prior Art

There are in the prior art various devices which cause a protective bag to inflate in front of a driver or passenger to cushion him from impact with the steering wheel, dashboard or other vehicle structure. Usually the device is atcivated by an inertial switch responsive to a crash impact of the automobile. This inertial switch in turn causes an inflating device to quickly inflate the collapsed bag into its inflated position deployed in front of the driver or passenger. The inflating gas is generally supplied either from a source of compressed air or other compressed gas, such as shown in U.S. Pat. No. 3,411,808; U.S. Pat. No. 3,414,031, and a number of other patents in the crash restraint field. Normally the compressed gas source is positioned adjacent the bag and discharges directly from an opening in the compressed gas container into the bag. In several other prior art patents (e.g. Kobori, U.S. Pat. No. 3,450,414; Teague et al., U.S. Pat. No. 3,532,359; and Selwa et al., U.S. Pat. No. 3,532,358) the bag is inflated by igniting a composition and directing the gaseous combustion products of the composition directly into the bag.

One of the major problems in such crash restraint systems is the "standing child" problem. To act as an effective cushion in a crash situation, the bag must be moved from its collapsed position to its inflated position in an extremely short period of time (in the order of 20 milliseconds). If one of the passengers (e.g., a child) happens to be leaning or standing against the dashboard when the bag inflates, the rapid expansion of the bag will throw the child backwards against the car seat. Therefore, the initial thrust of the expanding action of the bag must not be so violent as to hurl the person with such energy that the bag itself causes severe personal injury.

Another problem is the abrupt pressure increase generated in the car interior by the rapid expansion of the bag. Normally the interior of an automobile is reasonably air tight, and the sudden expansion of a bag causing a pressure shock in the car interior can possibly damage a person's ear drums.

Yet another problem in many of the prior art devices is the sound generated by the inflating system. This is generally a low frequency noise, sometimes in excess of 150 or 155 decibels, which, together with the sudden pressure increase in the car interior also can damage the occupant's ear drums or possibly otherwise do physical harm.

There are in the prior art a great many aspirating devices, and many of these are used to inflate life rafts and the like. Typical of these are Freygang, U.S. Pat. Nos. 2,399,670; Allen, U.S. 2,595,218; Bowman et al., U.S. 2,866,593; Kane, U.S. 2,975,958; Wilmar, U.S. 3,040,970; Fraibel, U.S. 3,042,290; Marsh et al., U.S. 056,540; Galiger et al., U.S. 3,086,848; Young et al., U.S. 3,158,314; Hadler, U.S. 3,204,862; and Day, U.S. 3,370,784. However, there is no teaching in these patents of adapting such devices for use in a crash restraint system.

SUMMARY OF THE INVENTION

It has been found that the above problem areas can definitely be alleviated to a significant degree by directing the inflating gas through an aspirating system to inflate the crash restraint bag. Desirably, this is accomplished by directing high velocity gas through a plurality of aspirating jets in an aspirating passageway, whose inlet communicates with the interior of the vehicle.

In one enbodiment a gas generating chemical composition is disposed in samll charges in a plurality of aspirating jet units. In another embodiment a source of compressed gas is used as a source of the high velocity gas, and preferably with augmentation from a gas producing chemical composition in the compressed gas source. As another alternative, a chemical gas generating unit is used independent of a compressed gas source.

Also, there is valve means closed at the initial stage of inflation, and open during inflation. At the completion of inflation, the valve means again closes. In one embodiment the valve means is a transverse plate which is rotatable through 180°. In another embodiment it is a fliexible membrane which after the initial stage of inflation moves against the gas generating jet cartridges to burn away so as to permit aspirating air to flow into the passageway. In yet another emobdiment there is one or more transverse fences, having flexible flap members which have a closed position transverse to the passageway and an open position where they lay against respective fences so as to be parallel to the path of aspirating air flow.

At the initial stage of inflation (in the first one or two milliseconds), the valve means remain closed so that the high velocity gas from the aspirating jet units can exert a higher pressure against the folded bag to overcome its inertial resistance and to cause it to begin accelerating toward its deployed position. During the rest of the inflation the valve is open to permit aspirating air to be drawn into the passageway to be mixed with the high velocity aspirating air to cause inflation of the bag.

If a person is quite close to the bag as inflation begins (e.g., the child standing against the dashboard), there is, in addition to the inertial resistance of the bag, the inertial resistance of the person. This will cause the valve means to remain closed for a longer period so as to slow down the inflation rate of the bag and alleviate the rate at which the person would otherwise be accelerated rearwardly in the car, or in the event the valve opens, there would be a "stalling" of the aspirating effect because of the back pressure caused by the inertial force of the person so as to inflate the bag at a lower rate.

Further, when the inflating device is drawing in aspirating air to cause the bag to inflate more rapidly, it is drawing in air from the car's interior so as to alleviate the rise of pressure caused by the bag occupying a certain volume of the car's interior. Also, there is a definite alleviation of the explosive noise associated with many other crash restraint systems. This is believed to occur because of the high velocity gas jets mixing with the aspirated air so as to dissipate the noise energy at the areas of mixing.

DESCRIPTION OF THE DRAWINGS

FIG. 11 is a view looking rearwardly on the front side of the apparatus shown in FIG. 8;

FIG. 12 is a view similar to FIG. 11 but showing a modification of the apparatus of FIG. 11; and FIGS. 13, 14 and 15 are longitudinal sectional views of the apparatus shown in FIGS. 11 and 12, showing the sequence of operation of the invention.

DESCRIPTION OF THE PREFERRED EMBODIMENTS

Figure 1:
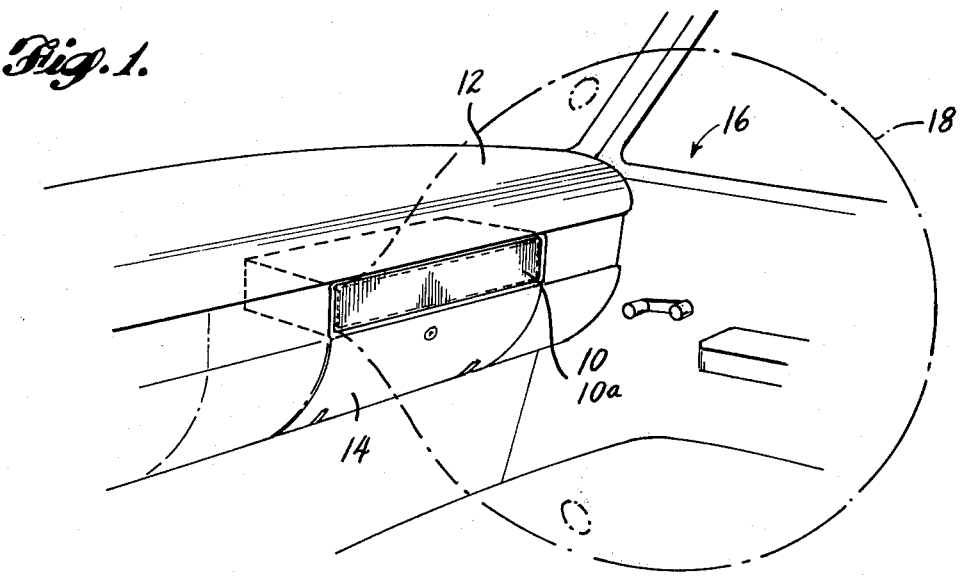
FIG. 1 is an isometric view of a portion of an automobile showing the apparatus of the present invention disposed therein.

With reference to FIG. 1, the apparatus 10 of the first embodiment of the present invention is shown mounted beneath the dashboard 12 and above the glove compartment 14 of an automobile, generally designated 16. In dotted lines of FIG. 1 there is shown a bag 18 which in a crash situation expands rearwardly to restrain a passenger in the automobile seat from being thrown forward to hit the dashboard 12 or other car structure.

Figure 2:
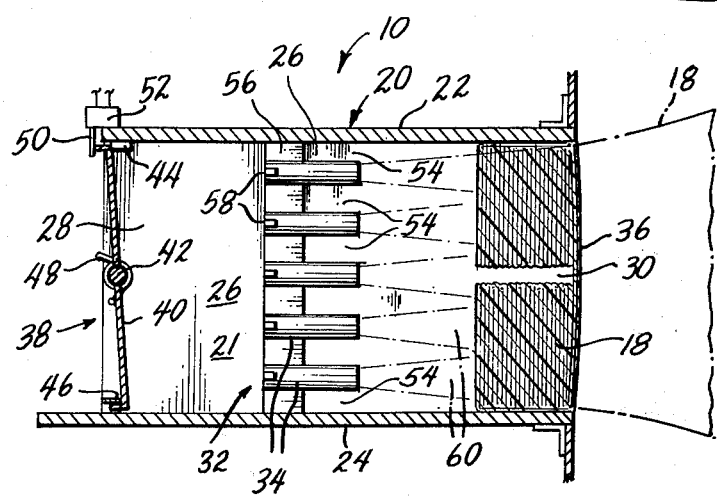
FIG. 2 is a longitudinal sectional view of one embodiment of the present invention at the time of firing of the cartridges.
Figure 3:
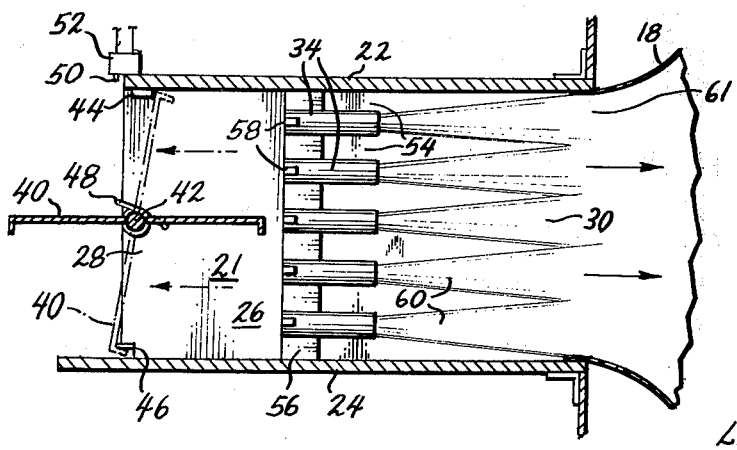
FIG. 3 is a view similar to FIG. 2, but showing the position of the valve during the firing cycle.
Figure 4:
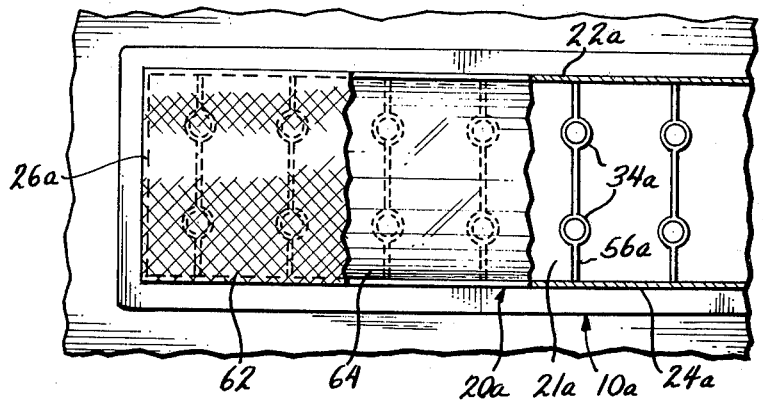
FIG. 4 is a fragmentary view of a second embodiment of the present invention as seen from a location forward of the apparatus of the present invention.
Figure 5:
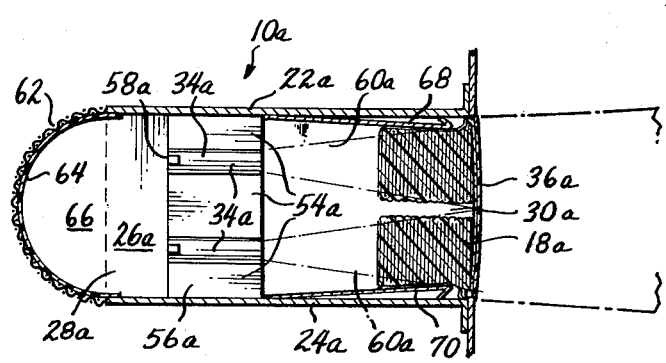
FIG. 5 is a transverse sectional view thereof at the time the cartridges have begun to fire.
Figure 6:
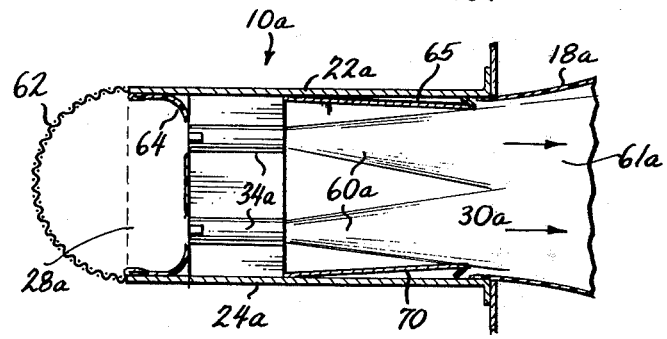
FIG. 6 is a view similar to FIG. 5, but showing the apparatus inflating the bag.
Figure 7:
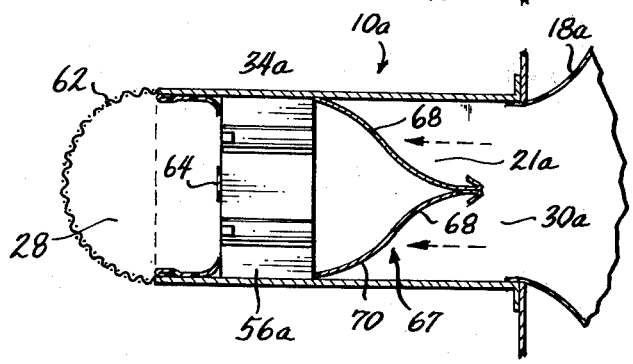
FIG. 7 is a view similar to FIGS. 5 and 6, but showing the apparatus after completion of the cartridge firing and with the bag inflated.
Figure 8:
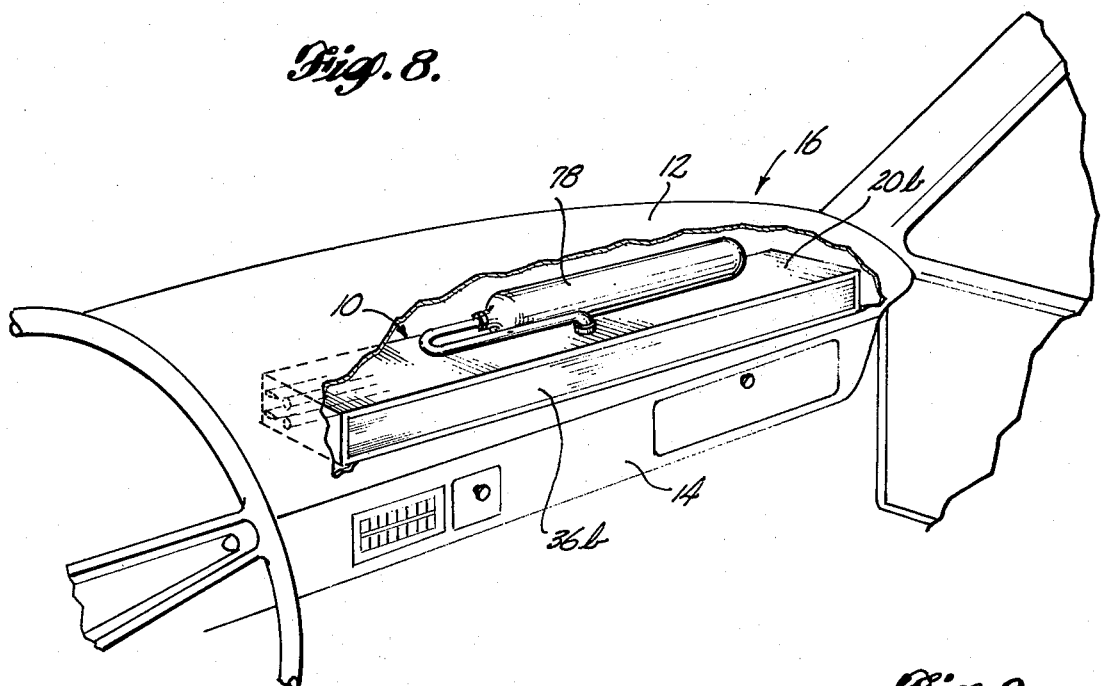
FIG. 8 is an isometric view showing a third embodiment of the present invention.

FIGS. 2 and 3 show the first embodiment of the present invention in more detail from a side view. There is a rectangular box-like housing frame 20 defining a through passageway 21 and comprising a top wall 22, bottom 24 and two sidewalls 26. This frame 20 defines a through passageway having a front inlet 28 and a rear outlet 30 facing the passenger location immediately behind. Intermediate the inlet 28 and outlet 30 is a gas generating assembly 32 which comprises a plurality of gas jet generating cartridges 34. At the rear outlet end of the frame 20 the bag 18 is folded in pleated fashion (i.e., in "accordion" fashion) and is covered by a rupturable membrane or deployable cover 36.

Mounted in the front inlet portion of the frame 20 is a valve mechanism 38 comprising a closure plate 40 pivotally mounted about a transverse rod 42 running through the midlength of the plate 40. There is an upper and lower stop member 44 and 46, respectively, against which the plate 40 bears in its closed position. A helical spring 48 mounted about the rod 42 urges the plate to rotate in a direction (as seen in FIG. 2) that is counterclockwise. However, this rotation is resisted by a finger 50 which engages the upper end of the plate 40.

Upon ignition of the gas generating cartridges 34, a switch 52 simultaneously is activated to remove the finger 50 from holding the plate 40. In the span of about 20 to 30 milliseconds, the plate 40 rotates to a 90° position as shown in the full lines of FIG. 3, and then continues rotation another 90° to be transversely aligned and again closing the front passageway inlet 28, as shown in dotted lines of FIG. 3.

There are several rows of gas generating cartridges 34, one of these rows being shown each in FIGS. 2 and 3, and the cartridges 34 are arranged in a rectangular pattern. The cartridges 34 are spaced moderately one from the other to form between proximate cartridges 34 and between the cartridges 34 and the top wall 22, bottom wall 24 and the sidewalls 26 a plurality of aspirating passages 54. These cartridges 24 are mounted by struts 56 which offer little obstruction to the air flowing through the passageway 21 defined by the frame 20.

To describe the operation of the first embodiment of the present invention, prior to crash impact, the bag 18 is stowed in its folded position in the rear outlet end of the frame 20. The closure plate 40 of the valve mechanism 38 blocks the inlet 28 to the passageway 21 defined by the frame 20. Upon crash impact, a suitable crash response mechanism (such as an inertial switch) initiates the firing of the cartridges 34 through the cartridge igniters 58 and simultaneously releases the finger 50 by activating the switch 52.

The cartridges 34 are arranged to discharge in a rearward direction against the folded bag 18. The initial thrust of the jet gas discharge, indicated by dotted lines at 60, pushes the bag 18 outwardly through the rupturable membrane 36. There is an initial back pressure of the exhaust gases toward the forward inlet end 28 of the passageway 21. This thrust is resisted by the closure plate 40 being in its blocking position, as shown in FIG. 2.

Within a few milliseconds, the bag 18 has been pushed outwardly a short distance, and the ejector or aspirating action of the gas jets 60 then begins to create a suction at the forward end 28 of the passageway 21. By this time, the action of the spring 48 has moved the closure plate to its open position shown in the full lines of FIG. 3. In this condition, ambient air flows in freely through the inlet 28 and is drawn in by aspirating action of the gas jets 60 to form a resultant air and exhaust gas mixture 61 which flows into the bag 18 to complete inflation.

By the time inflation of the bag is substantially complete, the cartridges 34 have completed their firing, the entire firing cycle taking about 20 to 30 milliseconds. By this time, the helical spring 48 has rotated the plate 40 to its closure position, where it is again transversely aligned to the passageway 21, as shown in the dotted lines of FIG. 3. This prevents the gas-air mixture which has inflated the bag 18, from escaping back through the passage inlet 28.

The apparatus of the second embodiment is illustrated in FIGS. 4 through 7. The overall dimensions of this second embodiment are more similar to those of the apparatus illustrated in FIG. 1. In describing the second embodiment, components of the second embodiment which are similar to those of the first embodiment will be given like numerical designations, with an *a* suffix distinguishing those of the second embodiment. The apparatus 10*a* of the present invention has a rectangular frame 20*a* having a through passageway 21*a* with a front inlet 28*a* and rear outlet 30*a*.

Within the passageway 21*a* are a plurality of gas jet generating cartridges 34*a* mounted on struts 56*a*. In the particular embodiment shown herein, these cartridges are arranged in two rows of 14 to make a total of 28 cartridges 34*a*. The second embodiment is different from the first embodiment in two major respects, first in the modification of the forward valve mechanism, and secondly in the addition of a check valve device mounted rearwardly of the cartridges 34*a*.

The forward valve mechanism of the second embodiment comprises an outer protective screen 62 within which is disposed a flexible substantially imperforate membrane 64 which closes the front inlet opening 28*a*. In its normal position, the screen 62 is spaced moderately forward from the rear of the cartridges 34 with the membrane fitting within and disposed against the screen 62. This leaves an air space 66 between the rear of the cartridges and the membrane 64. Upon ignition of the cartridges 34*a*, the bag 18*a* is moved outwardly and rearwardly as described in relation to the first embodiment. During the initial portion of the firing of the cartridges 34*a*, there is a back pressure from the bag 18*a* which pushes the membrane 64 against the screen 62. However, within a few milliseconds of ignition of the cartridges 34*a*, the bag 18*a* has been pushed outwardly to a moderate extent, and the action of the gas jets 60*a* causes an aspirating or ejector action which draws air forwardly from the space 66. This causes the membrane 64 to pull away from the screen 62 and move against the rear of the cartridges 34*a*. The heat of the cartridges burns the membrane 64 to substantially disintegrate the membrane 64 and provides an open passageway entrance 28*a*. Thus, ambient air is drawn in through the entrance 28*a* and is mixed with the gas jets 60 to form the resultant air-gas mixture 61*a*.

After the cartridges 34*a* have completed firing and the bag 18*a* is inflated, the pressure in the bag tends to push the air-gas mixture back out through the passageway 21*a*. To prevent this there is a check valve member 67 which comprises two moderately flexible plates 68 disposed against the upper and lower sidewalls 22*a* and 24*a* of the frame 20*a*. These plates 68 are anchored by their forward ends to their respective walls 22*a* of 24*a* just forward of the location of the cartridges 34*a*. As the gas-air mixture begins to flow outwardly from the bag 18*a* in a forward direction, the flow of the air-gas mixture causes the two plates 68 to move together in the passageway 21*a* and retain the air-gas mixture in the bag 18*a*.

The third embodiment is shown in FIGS. 8 through 15. As in the prior embodiments, the apparatus of the third embodiment is mounted beneath the dashboard 12 and above the glove compartment 14 of the automobile 16. The bag 18 is mounted to a box-like housing frame 20*b* defining a through passageway 21*b*, having a front inlet 28*b* and a rear outlet 30*b*, facing toward the passenger location immediately behind. The bag 18*b* is mounted in pleated fashion in the rear outlet 30*b* and is covered by a rupturable membrane 36*b*. The inlet 28*b* communicates with the interior of the automobile 16.

Mounted within the housing frame 20*b* are a plurality of aspirating jet units 70 arranged in two horizontal rows so as to be distributed evenly across the housing 20*b*. The upper row of jet units 70 is mounted to an upper transverse horizontal manifold tube 72 and the lower set of jet units 70 is similarly mounted to a lower manifold tube 74. These tubes 72 and 74 in turn are fed by a central manifold member 76 which in turn communicates by a tube 78 with a source 80 of compressed air or other gas mounted above the housing 20*b*.

Figure 9:
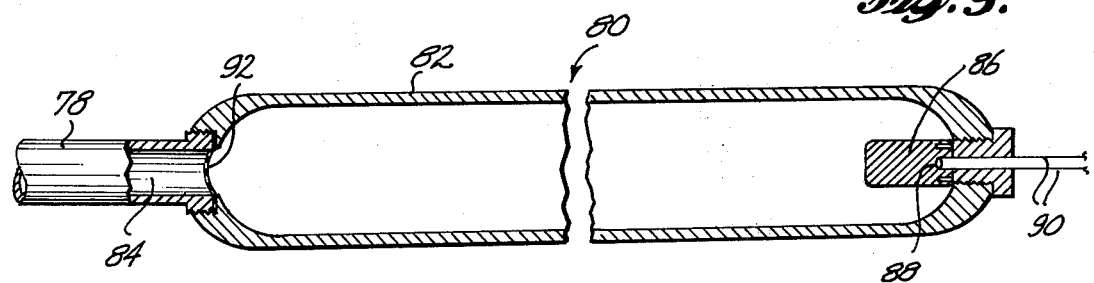
FIG. 9 is a sectional view of the augmented compressed gas source shown in FIG. 8.

As shown in FIG. 9, the gas source 80 comprises an elongate high pressure vessel 82 having an outlet 84 at one end communicating with the aforementioned manifold member 76 through the tube 78. The vessel 82 is filled with compressed air or some other compressed gas at a pressure of about 3000 psi. At the opposite end of the vessel 80 is a charge of a propellant type composition 86 having a suitable igniter 88 connected to leads 90, which in turn are connected to a suitable crash responsive mechanism such as one of the inertial switches (not shown herein), disclosed in the prior art. The composition 86 is characterized in that it generates a high volume of gas relative to the heat produced. A typical such composition is one of the prior art propellant compositions made up of nitrocellulose, nitroglycerine, diethylphthalate and small amounts of other ingredients. A rupturable membrane 92 closes the outlet opening 88 of the vessel 80.

Preferably, the compressed gas is air with a reduced oxygen content (less than 20% by weight and desirably about 10% by weight), so that there is less danger of sustaining a fire that might start in a crash situation. On the other hand, if the chemical composition 86 is such as to produce carbon monoxide, the 10 percent oxygen will react with this to form carbon dioxide and thus eliminate the danger of the carbon monoxide being inhaled by the occupants.

Figure 9A:
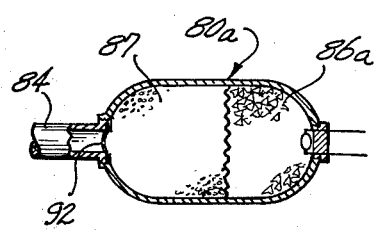
FIG. 9A is a sectional view of an optional source of aspirating gas for the present invention.

In FIG. 9A is indicated schematically an alternate gas source 82*a* in which there is no stored compressed gas. There is a charge of a chemical composition 86*a* (e.g., 80% sodium azide and 20% potassium perchlorate by weight) which generates a combustion gas mixture which passes through a suitable secondary chamber 87 (containing, for example, alumina or silica) to remove undesired combustion products and supply the aspirating gas through the tube 78.

At the housing inlet 28*b* there is a valve mechanism, generally designated 94. This comprises a transverse screen 96 extending across the inlet 28*b*. Adjacent the screen 96 and immediately rearwardly thereof are a pair of horizontal transverse fences 98 and 100, respectively. Attached to the front end of each of the fences 98 and 100 is a respective one of two flap members 102 and 104. These flaps 102 and 104 are made of a flexible material and are connected each to its respective fence 98 or 100 at its horizontal centerline. The two flaps 102 and 104 are so dimensioned that when positioned transversely against the screen 96, these flaps 102 and 104 close the front inlet 28*b*.

To describe the operation of the third embodiment, let it be assumed that the automobile 16 is in a crash situation. The crash sensor sends an electric current through the leads 90 to cause the igniter 88 to initiate combustion of the composition charge 86. As the composite 86 begins to burn so as to emit gaseous combustion products, a pressure front travels down the pressure vessel 82 to cause the pressure sensitive membrane 92 to rupture and cause the compressed air in the vessel 82 to travel through the tube 78 to the manifold chamber 76 and out the two manifold tubes 72 and 74 to exit as high velocity jet gas streams out the jet units 70. In the first millisecond or two of the air being emitted from the jet units 70 there is a substantial back pressure from the inertia of the bag 18b, which is just beginning to inflate. This back pressure causes the two flaps 102 and 104 of the valve assembly 94 to press against the front screen 96 so as to close the front inlet opening 28b.

As soon as the bag 18b begins to move outwardly into the passenger compartment of the automobile 16, the back pressure from the bag 18b is reduced, and the aspirating action of the jet units 70 causes a reduction of pressure in the inlet area 28b to cause the two flap members 102 and 104 to move rearwardly against their respective fences 98 and 100 so as to open the passageway 28b and permit aspirated air to flow into the housing 20b. This aspirated air mixes with the aspirating air jets 106 to produce a resulting gas mixture 108 which inflates the bag, as shown in FIG. 14.

After about 20 milliseconds when the bag is fully inflated, there is an increase in back pressure from the bag 18b. This causes the flaps 102 and 104 to move back against the screen 96 so as to close the inlet 28b, as shown in FIG. 15.

It will be noted that as the bag 18b is being inflated in its aspirating mode, as shown in FIG. 14, air from within the passenger compartment is being drawn into the interior of the bag as aspirated air. Thus, while the bag is occupying a certain volume within the car so as to raise pressure within the automobile, there is the simultaneous action of removing air from within the automobile 16 so as to alleviate this pressure rise.

Further, it has been found that the aspirating action of the jet units 70 mixing with the aspirating air tends to dissipate to a significant degree what is in many prior art devices a rather severe sound wave emitted from the inflating apparatus.

Figure 10:
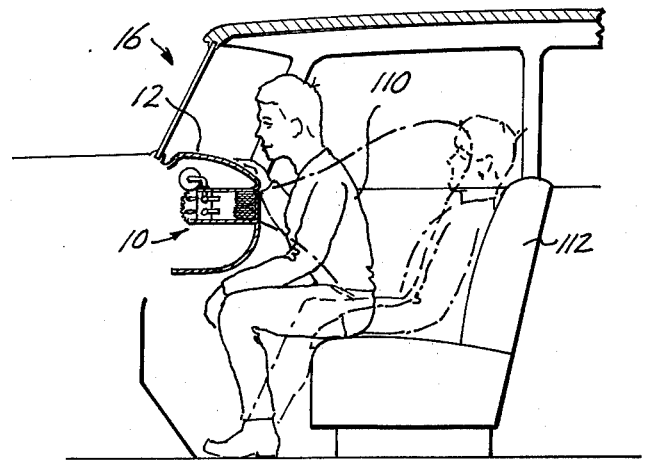
FIG. 10 is a side elevational view illustrating the operation of the present invention in the situation where a person is next to the dashboard of the automobile.

With respect to the aforementioned "standing child" problem, this aspect of the invention is disclosed with reference to FIG. 10. In FIG. 10 is shown a child 110 leaning against the dashboard 12 of the automobile 16. Upon initial inflation, the bag encounters the child 110, and thus there is the combined inertial force of the bag 18b itself and the child 110. This force causes sufficient back pressure to close the flaps 102 and 104 for a greater length of time than would otherwise occur, or at least causes stalling of the aspirating action of the jet units 70. The effect is that since little or no aspirated air is then being drawn into the passageway inlet 28b, the rate of inflation is slower. Thus, the child 110 is moved back against the seat 112 at a slower rate.

A modification of the present invention is illustrated in FIG. 12, wherein a portion of the flaps 102 and 104 is cut away, as at 114. It has been found that it is possible to remove about 20 to 40% of the flap area so that the flaps 102 and 104 only close 60 to 80% of the inlet area. However, this amount of closure is sufficient to accomplish the operating sequence shown in FIGS. 13, 14 and 15. At the completion of inflation (as shown in FIG. 15) the opening 114 permits venting back through the inlet opening 28b so as to alleviate the "rebound action" of the bag throwing the occupant back against the seat immediately after cushioning the crash impact.

What is claimed is:
1. In a vehicle having an interior within which is an occupant carrying location and having structure spaced from said location, a crash restraint apparatus for protecting an occupant in said location from impact with said structure, said apparatus comprising:
   a. a housing frame having lateral wall means defining a through aspirating passageway with an upstream inlet opening and a downstream outlet opening,
   b. a collapsed inflatable mounted within said passageway proximate said outlet opening, and arranged to be moved from said passageway and through said outlet opening and inflated by gas flowing from said outlet opening to an inflated position between said passenger location and said structure,
   c. a plurality of laterally spaced aspirating jet units mounted to said frame and positioned across substantially all of said passageway and upstream of said collapsed inflatable, said jet units arranged to direct a plurality of laterally spaced high velocity aspirating streams of a gaseous discharge in said passageway in a downstream direction,
   d. valve means mounted to said housing frame positioned at said passageway upstream of said jet units, said valve means having:
      1. an initially closed position during a first portion of the time of gas flow from said jet units, with said valve means substantially blocking said passageway upstream of said jet units, so that initial gas flow from said jet units into said passageway creates a positive pressure in said passageway sufficient to move said inflatable at a relatively high velocity out through said passageway toward said inflated position, and
      2. a subsequent open position during a second portion of the time of gas flow from said jet units to permit an inflow of aspirated air through said passageway inlet opening aspirating action of the high velocity streams of gas from said jet units to make a gas mixture of the aspirating gas and the aspirated air to inflate the inflatable to its protective position,
   e. said valve means being a flap type check valve having a closed position generally transverse to said passageway and movable to an open position generally parallel to direction of flow in said passageway in response to pressure reduction downstream in said passageway and movable to its closed position upon pressure increase downstream of said passageway, and
   f. said flap valve having at least one support member disposed generally transverse of said passageway and a lateral surface extending downstream, with at least one flexible flap member mounted on said support member, which flap member is movable against the lateral surface of the support member to an open position and away from the lateral surface of the support member to a transverse position to close the passageway.

2. The apparatus as recited in claim 1, wherein there are two flap members on opposite sides of said support member, and two lateral surfaces on said support member against which the flap members are moved when the flap members are moved to their open position.

3. The apparatus as recited in claim 2, wherein said flap member in its closed position provides a partial opening of said passageway.

4. The apparatus as recited in claim 2, further comprising a screen member upstream of said flap members and arranged to hold said flap members in their transverse closed position in response to downstream gas pressure during said first portion of the time of the gas flow from said jet units.

5. The apparatus as recited in claim 1, further comprising a screen member upstream of said flap member and arranged to hold said flap member in its transverse closed position in response to downstream gas pressure during said first portion of the time of the gas flow from said jet units.

* * * * *